United States Patent
Kumar et al.

(10) Patent No.: US 12,210,992 B2
(45) Date of Patent: Jan. 28, 2025

(54) MULTI-PARTY BUSINESS COLLABORATION PLATFORM FOR ELECTRIFICATION ECOSYSTEMS

(71) Applicant: Hitachi, Ltd., Tokyo (JP)

(72) Inventors: Amit Kumar, San Jose, CA (US);
Pierre Huyn, Milpitas, CA (US);
Prasun Singh, San Jose, CA (US);
Ravigopal Vennelakanti, San Jose, CA (US);
Umeshwar Dayal, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 17/976,719

(22) Filed: Oct. 28, 2022

(65) Prior Publication Data
US 2024/0144129 A1    May 2, 2024

(51) Int. Cl.
G06Q 10/00    (2023.01)
G06Q 10/0633    (2023.01)
G06Q 10/10    (2023.01)

(52) U.S. Cl.
CPC ....... *G06Q 10/0633* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 7,305,392 B1 * | 12/2007 | Abrams | G06Q 10/10 707/999.009 |
| 2018/0182052 A1 * | 6/2018 | Panagos | G06Q 10/10 |
| 2019/0102681 A1 * | 4/2019 | Roberts | G06N 20/00 |
| 2019/0319804 A1 * | 10/2019 | Mathew | G09C 1/00 |
| 2020/0111080 A1 * | 4/2020 | Metcalfe | H04L 9/3255 |
| 2020/0160267 A1 * | 5/2020 | Thennadil | G06Q 10/0836 |
| 2020/0169619 A1 * | 5/2020 | Bedi | H04L 67/125 |

(Continued)

OTHER PUBLICATIONS

Encrypting On-Chain Data, Blockchain Patterns, Jul. 21, 2021, https://research.csiro.au/blockchainpatterns/general-patterns/data-management-patterns/encrypting-on-chain-data/, p. 1-4. (Year: 2021).*

(Continued)

*Primary Examiner* — Joseph M Waesco
(74) *Attorney, Agent, or Firm* — Procopio, Cory, Hargreaves & Savitch LLP

(57) ABSTRACT

A method for sharing and analyzing information to support execution of multi-party workflows in an electrification ecosystem. The method may include creating or updating shared data schema and data governance rules associated with data to be received from a plurality of parties, wherein the plurality of parties are stakeholders to the multi-party workflows, and the data is associated with a battery system; submitting the shared data schema and the data governance rules for approval to the plurality of parties; creating or updating decision logics associated with the data to be received; submitting the decision logics for approval to the plurality of parties; receiving the data from the plurality of parties; and applying the approved shared data schema, the approved data governance rules, and the approved decision logics to the multi-party workflows and the received data from the plurality of parties to perform automated decision optimization.

14 Claims, 10 Drawing Sheets

(56) References Cited

U.S. PATENT DOCUMENTS

| | | | | |
|---|---|---|---|---|
| 2022/0261660 A1* | 8/2022 | Roberts | ............... | G06N 20/20 |
| 2022/0383236 A1* | 12/2022 | Beede | ................. | G16H 40/20 |
| 2022/0391917 A1* | 12/2022 | Fan | ..................... | G06N 20/00 |
| 2023/0017447 A1* | 1/2023 | Mathew | ............. | H04L 9/0869 |
| 2023/0076019 A1* | 3/2023 | Panagos | ............ | G06Q 50/265 |

OTHER PUBLICATIONS

Global Battery Alliance. "Action Partnerships: Battery Passport". Retrieved: Oct. 28, 2022. URL: https://www.globalbattery.org/battery-passport/. English Language. 6 pages.

Circulor. "What the EU Battery Regulations tells us about the Passport". Retrieved: Oct. 28, 2022. URL: https://www.circulor.com/battery-passport. English Language. 4 pages.

Everledger. "What is the Battery Passport?" Retrieved: Oct. 28, 2022. URL: https://everledger.io/industry-solutions/batteries/ev-battery-passport-eu-regulations/. English Language. 8 pages.

Cision PR Newswire. "Everledger Launches Battery Passport Pilot with Ford". Seattle, Washington, Oct. 25, 2022. Retrieved: Oct. 28, 2022. URL: https://www.prnewswire.com/news-releases/everledger-launches-battery-passport-pilot-with-ford-301658067.html. English Language. 3 pages.

\* cited by examiner

MULTI-PARTY BUSINESS COLLABORATION PLATFORM FOR ELECTRIFICATION ECOSYSTEMS

BACKGROUND

Field

The present disclosure is generally directed to a method and a system for sharing and analyzing information to support execution of multi-party workflows in an electrification ecosystem.

Related Art

Electrification technology companies are facing challenges such as life-cycle management of new products, soft costs minimization across the value chain, and rising customer expectations. Moreover, new ecosystems such as charging infrastructure, battery asset financing and insurance, and second-life applications, begin to require businesses to form effective partnerships among multiple parties.

Throughout the lifecycle of a battery product, various types of data are generated by multiple partners in the electrification ecosystem. For example, battery suppliers may have manufacturing and testing data related to battery cell, battery module, and battery pack; battery product OEM may have battery product (e.g., electric vehicle, stationary storage, and etc.) manufacturing data, testing data, and product sales data; an asset owner may have product usage data, and a service partner may have service diagnostics data. However, these data are typically stored in organization silos and thus making it difficult to share data among partners for effective collaboration due to lack of trust in the data and data integration challenges.

In the related art, battery passport provides battery data framework that enables data collection to promote transparency, sustainability, and safety in association. The battery passport began as a European Union initiative geared at establishing a sustainable battery value chain. However, it is unclear as to how this data is leveraged as the battery passport has yet to be launched as a commercial product. In addition, battery passports use a pre-defined data schema and fail to address requirements of evolving business workflows.

SUMMARY

Aspects of the present disclosure involve an innovative method for sharing and analyzing information to support execution of multi-party workflows in an electrification ecosystem. The method may include creating or updating shared data schema and data governance rules associated with data to be received from a plurality of parties, wherein the plurality of parties are stakeholders to the multi-party workflows, and the data is associated with a battery system; submitting the shared data schema and the data governance rules for approval to the plurality of parties; creating or updating decision logics associated with the data to be received; submitting the decision logics for approval to the plurality of parties; receiving the data from the plurality of parties; and applying the approved shared data schema, the approved data governance rules, and the approved decision logics to the multi-party workflows and the received data from the plurality of parties to perform automated decision optimization.

Aspects of the present disclosure involve an innovative non-transitory computer readable medium, storing instructions for sharing and analyzing information to support execution of multi-party workflows in an electrification ecosystem. The instructions may include creating or updating shared data schema and data governance rules associated with data to be received from a plurality of parties, wherein the plurality of parties are stakeholders to the multi-party workflows, and the data is associated with a battery system; submitting the shared data schema and the data governance rules for approval to the plurality of parties; creating or updating decision logics associated with the data to be received; submitting the decision logics for approval to the plurality of parties; receiving the data from the plurality of parties; and applying the approved shared data schema, the approved data governance rules, and the approved decision logics to the multi-party workflows and the received data from the plurality of parties to perform automated decision optimization.

Aspects of the present disclosure involve an innovative server system with a fully decentralized and replicated data repository for sharing and analyzing information to support execution of multi-party workflows in an electrification ecosystem. The server system may include creating or updating shared data schema and data governance rules associated with data to be received from a plurality of parties, wherein the plurality of parties are stakeholders to the multi-party workflows, and the data is associated with a battery system; submitting the shared data schema and the data governance rules for approval to the plurality of parties; creating or updating decision logics associated with the data to be received; submitting the decision logics for approval to the plurality of parties; receiving the data from the plurality of parties; and applying the approved shared data schema, the approved data governance rules, and the approved decision logics to the multi-party workflows and the received data from the plurality of parties to perform automated decision optimization.

Aspects of the present disclosure involve an innovative system for sharing and analyzing information to support execution of multi-party workflows in an electrification ecosystem. The system may include means for creating or updating shared data schema and data governance rules associated with data to be received from a plurality of parties, wherein the plurality of parties are stakeholders to the multi-party workflows, and the data is associated with a battery system; means for submitting the shared data schema and the data governance rules for approval to the plurality of parties; creating or updating decision logics associated with the data to be received; means for submitting the decision logics for approval to the plurality of parties; means for receiving the data from the plurality of parties; and means for applying the approved shared data schema, the approved data governance rules, and the approved decision logics to the multi-party workflows and the received data from the plurality of parties to perform automated decision optimization.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

Figure 1:
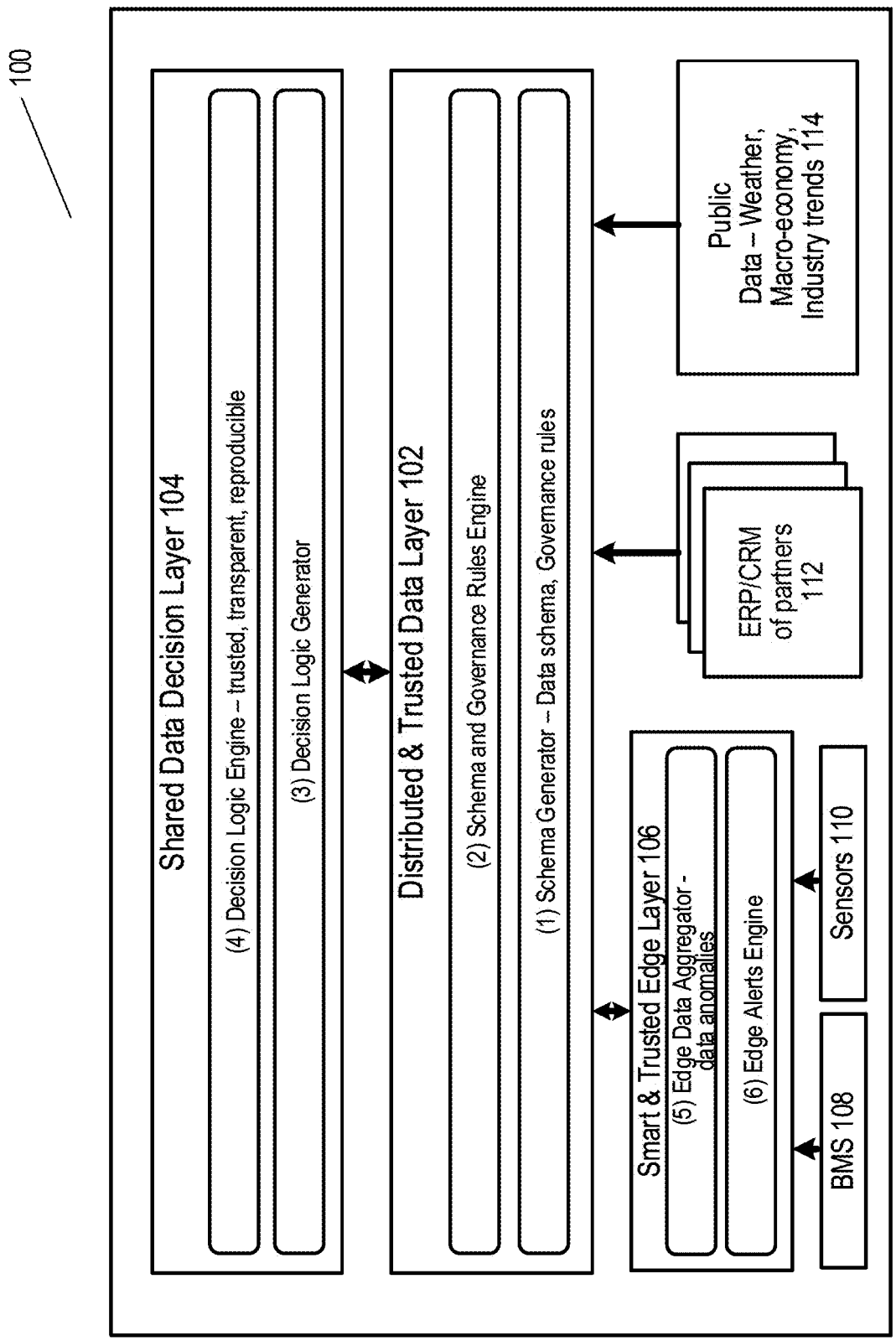
FIG. 1 illustrates an example framework architecture, in accordance with an example implementation.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

A solution framework that enables trusted collaboration between multi-party electrification ecosystem stakeholders by providing data traceability and transparency, automated and trusted decisions, process simplification, and trusted analytical insights, is provided. Example use cases include warranty and performance guarantee costs optimization, and decision optimization for second-life battery applications and recycling.

The framework supports a broad range of electrification ecosystem applications that include, but not limited to, battery assets management and circularity enablement in the battery value chain. Example problems that can be solved using the framework include:

A. Warranty and performance guarantee cost optimization, which includes:
   a. Warranty term violation detection;
   b. Warranty and performance risk sharing;
   c. Asset service/maintenance costs and insurance payouts sharing in case of joint ownership; and
   d. Insurance premium determination based on usage and risk profile.

B. Decision optimization for end-of-life battery applications and recycling, which includes:
   a. Offer recommendation optimization for used battery procurement and sale;
   b. Decision making for repurpose vs. recycle; and
   c. Shipping and logistics optimization.

FIG. 1 illustrates an example framework architecture 100, in accordance with an example implementation. In the example framework architecture 100, there is distributed and trusted data layer 102, shared data decision layer 104, and smart and trusted edge layer 106. The distributed and trusted data layer 102 comprises a schema and governance rules engine and a schema generator. The schema generator creates or updates shared data schema and data governance rules. The data schema and data governance rules generated by the schema generator are submitted to all relevant stakeholders for approval. The schema and governance rules engine uses the approved/agreed data schema and data governance rules from the stakeholders for business workflows.

The shared data decision layer 104 comprises a decision logic generator and a decision logic engine. The decision logic generator creates or updates logic for various decisions, and submits the logics to the relevant stakeholders for approval. The decision logic engine applies the approved/agreed logic for various decisions when invoked by workflow application.

The smart and trusted edge layer 106 comprises an edge data aggregator and an edge alerts engine. The edge data aggregator aggregates sensor data from sensors 110 and data from management system such as battery management system (BMS) 108 to identify anomalies based on approved anomaly decision logic. The edge alerts engine generates user alerts and recommends desired actions based on a user action recommendation decision logic.

A subset of enterprise resource planning data (ERP)/customer relationship management data (CRM) 112 can be made available to the public and shared amongst the relevant stakeholders. Such information may include, but not limited to, manufacturer warranty terms, performance guarantees, etc. Public data 114 such as, but not limited to, current weather and forecasts, macro-economy, industry trends, etc. can also be shared with the relevant stakeholders due to their relevance in decision making. For example, weather can impact the battery performance and may potentially interfere with warranty or performance guarantee terms.

Figure 2:
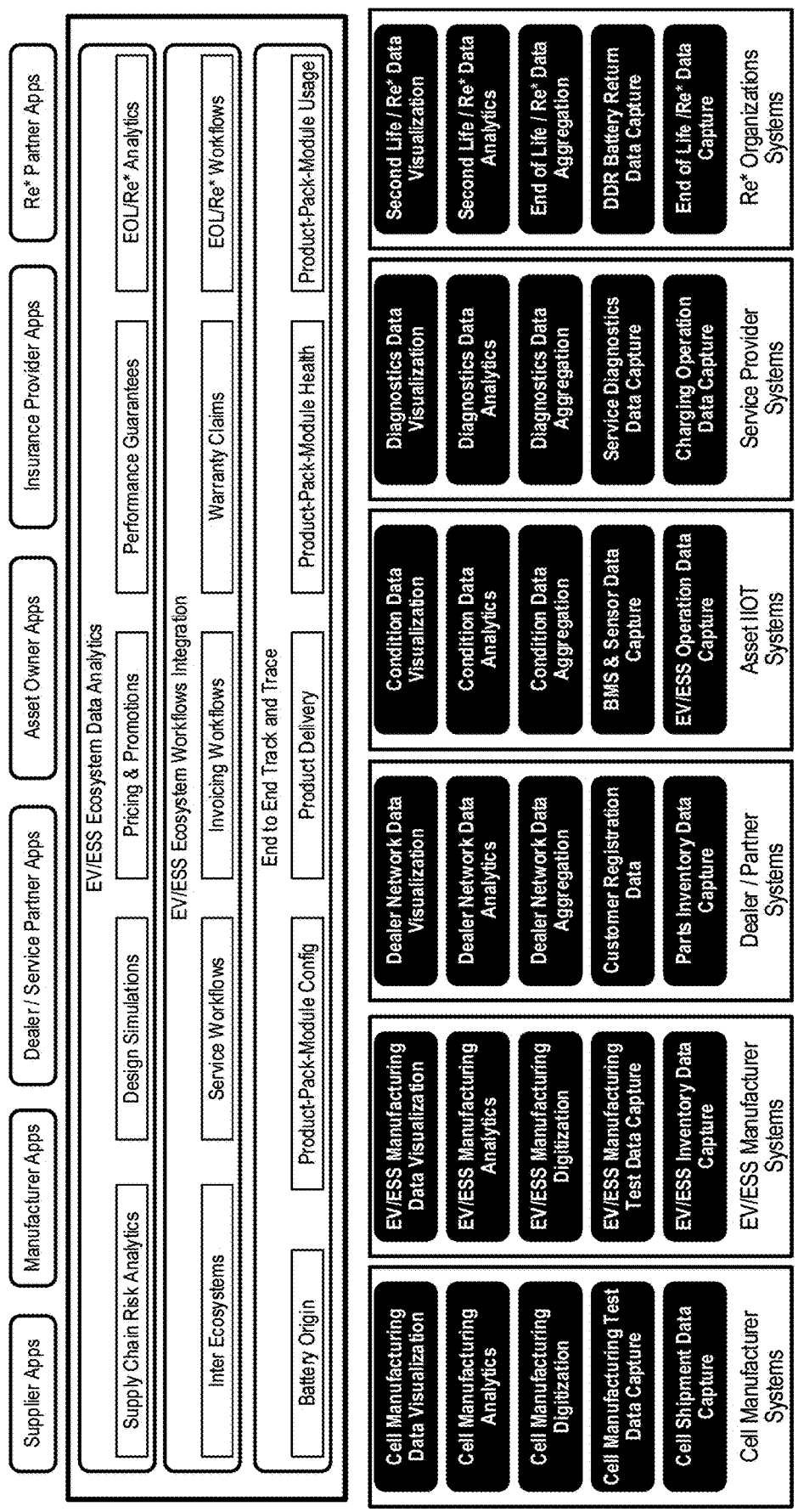
FIG. 2 illustrates an example electrification ecosystem functional model, in accordance with an example implementation.

FIG. 2 illustrates an example electrification ecosystem functional model, in accordance with an example implementation. The electrification ecosystem functional model may be utilized in electrification ecosystem use cases such as, but not limited to, warranty and performance guarantee, end-of-life battery management, etc. For each of the use cases, participants in a business network are identified. Functionalities and workflows among these participants are then defined. As illustrated in FIG. 2, end-to-end track and trace function, workflows integration, and data analytics can be implemented and used in the electrification ecosystem functional model. For the two use cases, example functions and workflows include performance guarantees and EOL/Re* analytics under data analytics, warranty claims and EOL/Re* workflows under workflows integration, and product-pack-module configuration, product delivery, product-pack-module health, and product-pack-module usage under end-to-end track and trace.

Figure 3:
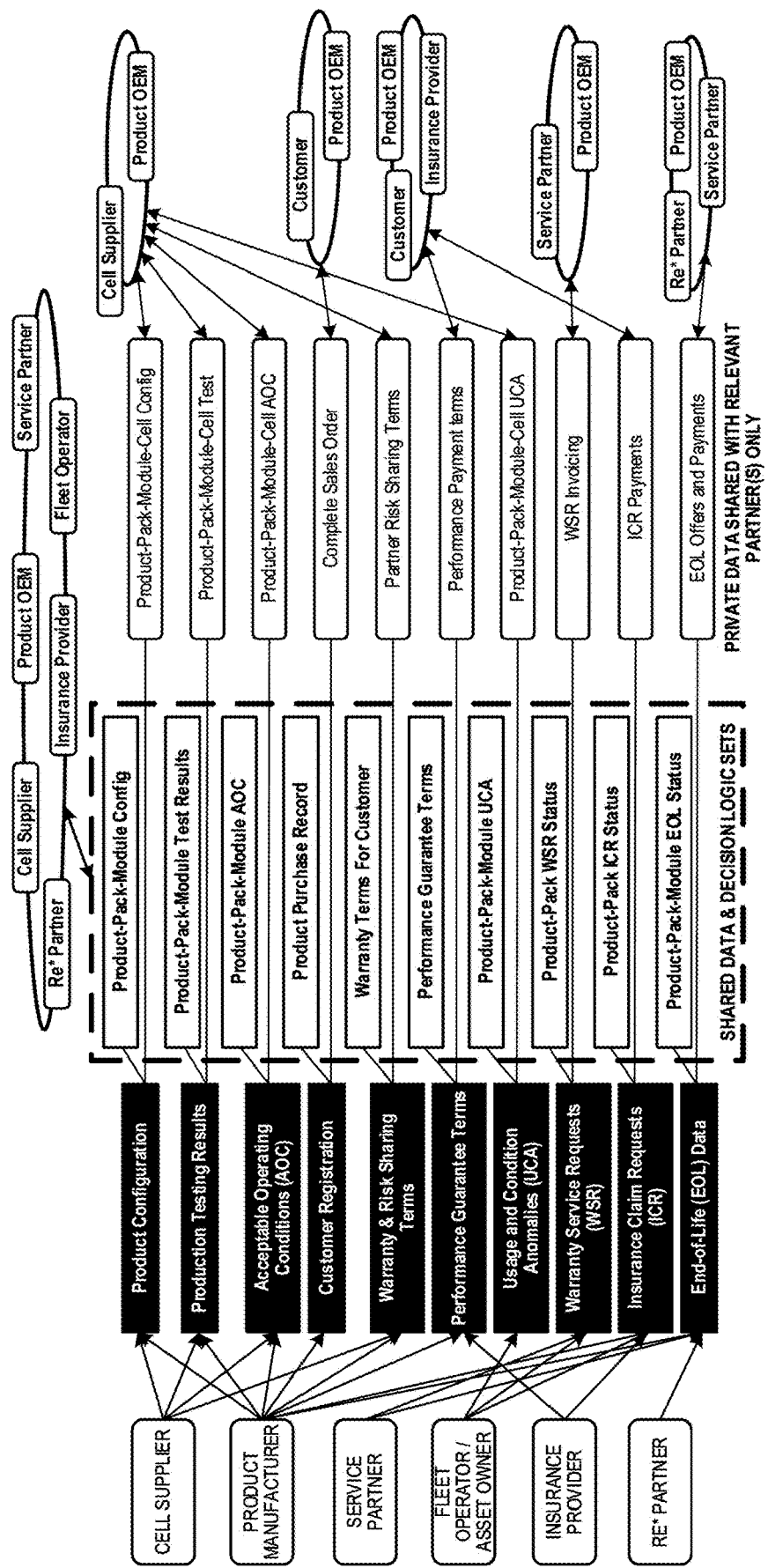
FIG. 3 illustrates example collection of data attribute categories in an electrification ecosystem, in accordance with an example implementation.

FIG. 3 illustrates example collection of data attribute categories in an electrification ecosystem, in accordance with an example implementation. As illustrated in FIG. 3, data is provided/generated by the relevant stakeholders to the platform for sharing and analyzing. Data may include, but not limited to, product configuration, production testing results, acceptable operating conditions (AOC), customer registration, warranty and risk sharing terms, performance guarantee terms, usage and condition anomalies (UCA), warranty service requests (WSR), insurance claim requests (ICR), end-of-life (EOL) data, and etc. Certain data may only be obtained from a subset of stakeholders, e.g. production configuration data may be obtained from or generated by a cell supplier or a product manufacturer as shown in FIG. 3.

The received data is then converted into shared data and private data. The shared data and the decision logic sets can be accessed by all stakeholders. On the other hand, private data can only be accessed by relevant partners that represent a subset of the stakeholders. For example, ICR payments under private data may only be accessed by customer, product OEM, and insurance provider. This ensures that only relevant parties may have access to data that are deemed private.

Figure 4:
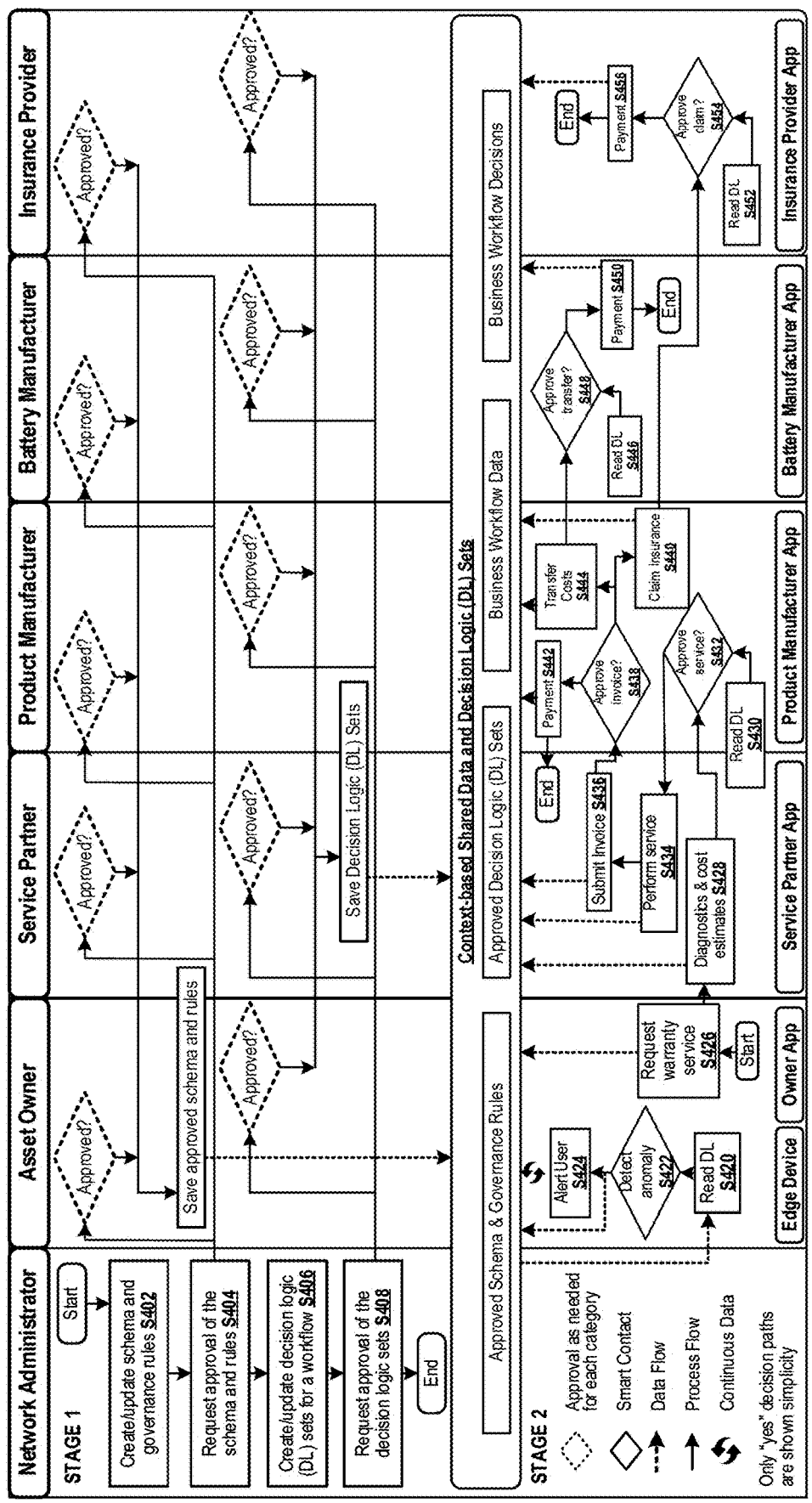
FIG. 4 illustrates an example process flow of an automated warranty and performance guarantee process (first use case) utilizing the framework architecture, in accordance with an example implementation.

FIG. 4 illustrates an example process flow of an automated warranty and performance guarantee process (first use case) utilizing the framework architecture, in accordance with an example implementation. At stage 1, schema and rules, as well as decision logic (DL) sets are created by the network administrator and approved by the relevant stakeholders. As illustrated in FIG. 4, the process begins by creating or updating schema and governance rules by the network administrator at S402. At S404, the network administrator requests the relevant stakeholders' approval of the schema and rules. Once the schema and rules are approved by the relevant stakeholders, the schema and the rules are then stored. At S406, the network administrator creates or updates DL sets for a workflow. At S408, the network administrator requests the relevant stakeholders' approval of the DL sets. Once the DL sets are approved by the relevant stakeholders, the DL sets are then stored. The approved schema and rules, and the DL sets, are stored under context-based shared data and DL sets, and may be retrieved during the workflow. The context-based shared data and DL sets provides data traceability and transparency, and provides automated decisions based on stakeholder input. The context-based shared data and DL sets simplifies workflow processing and provides trusted analytics insights.

Stage 2 of the warranty and performance guarantee process (first use case) applies the approved schema and rules, and the DL sets to the workflow. For the edge device, smart & trusted edge layer 106, the process begins by reading the DL sets at S420. At S422, the edge device aggregates sensor data from sensors 110 and data from management system through the edge data aggregator to identify anomalies. At S424, the edge device then alerts the user and recommends desired actions.

For the general workflow, the process begins at an asset owner's end, where the asset owner makes a request for warranty service through application on owner's end at S426. The warranty service request is stored and tracked under the context-based shared data and DL sets. At S428, on receiving the warranty service request, a service partner performs diagnostics and cost estimates at S428. On completion of S428, the information is stored under the context-based shared data and DL sets, and provided to product manufacturer. At S430, the DL sets are read on the product manufacturer's end. At S432, a determination is made on whether to approve service based on read DL sets. If service is approved at S432, then service performance approval is provided to the service partner at the service partner application and the service partner performs the service. Data or information pertaining to service performance is stored at the context-based shared data and DL sets. At S436, an invoice in association with the performed service is generated and stored.

After the invoice is generated at S436, a decision is made by the product manufacturer on whether to approve the received invoice based on the read DL sets at S438. If the product manufacturer approves the invoice, then payment is made at S442 and the approval is stored at the context-based shared data and DL sets. The process then comes to an end.

If the product manufacturer does not approve the invoice, the product manufacturer may then proceed to transfer costs at S444 or claim insurance at S440. As with prior steps, data or information pertaining to cost transferring at S444 or insurance claiming is stored at the context-based shared data and DL sets. Following S440, the insurance claim information is received by an insurance provider. At S452, the DL sets are read on the product manufacturer's end. At S454, a determination is made by the insurance provider on whether to approve the insurance claim based on the read DL sets. If the insurance provider approvers the insurance claim, then payment is made at S456, and the process comes to an end. Data or information pertaining to insurance claim payment at S456 is stored at the context-based shared data and DL sets.

Following S444, cost transferring is received by a battery manufacturer that produced the underlying product for which the warranty service is requested. At S446, the DL sets are read on the battery manufacturer's end. At S448, a determination is made by the battery manufacturer on whether to approve the cost transfer based on the read DL sets. If the battery manufacturer approvers the cost transfer, then payment is made at S450 and the process comes to an end. Data or information pertaining to cost transfer payment at S450 is stored at the context-based shared data and DL sets.

The data or information stored at the context-based shared data and DL sets during stage 2 can be accessed and reviewed by the relevant stakeholders based on the approved schema and governance rules. The data or information stored during stage 2 can be further divided into business workflow data and business workflow decisions.

Figure 5:
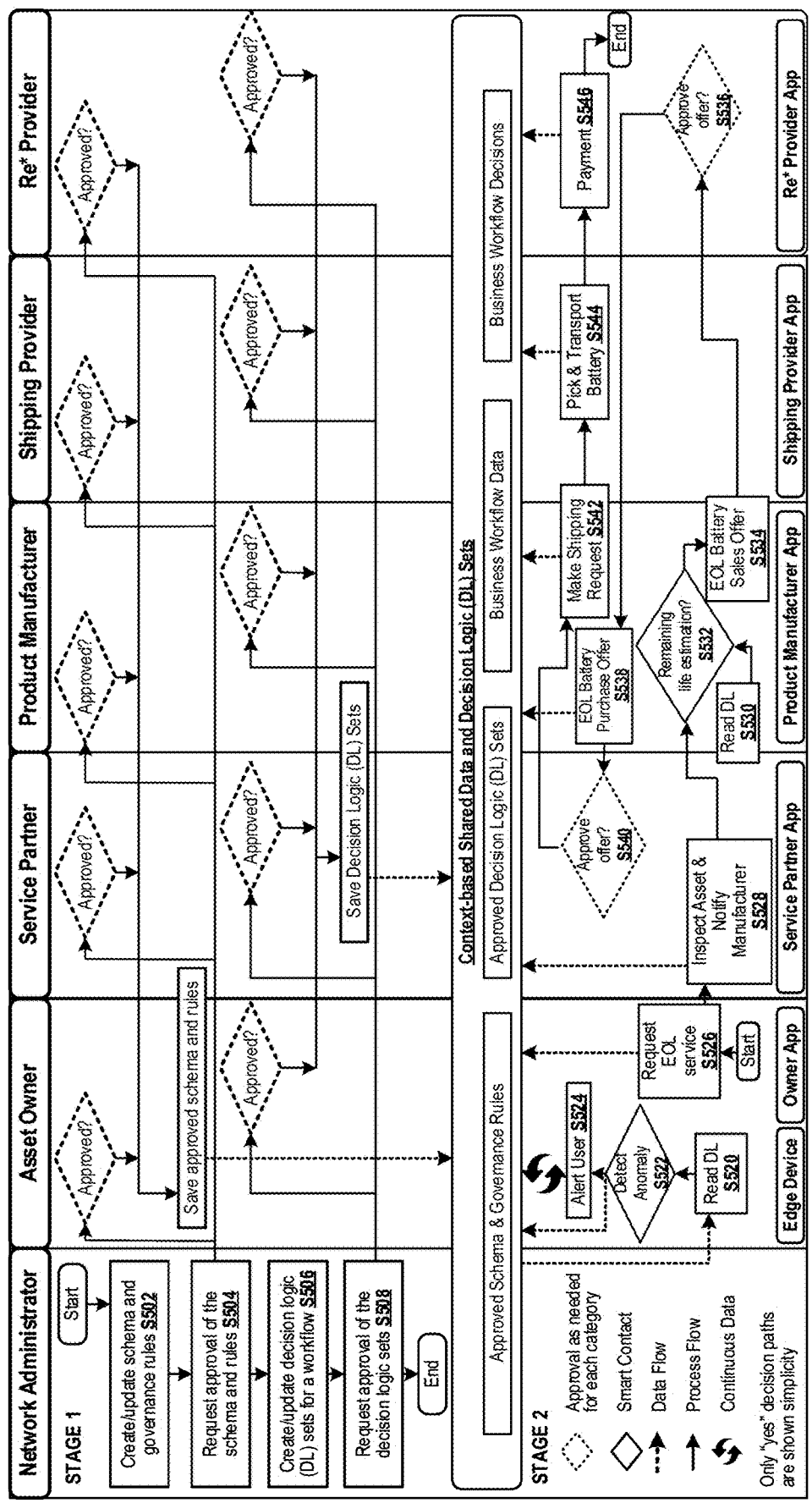
FIG. 5 illustrates an example process flow of an automated end-of-life battery management process (second use case) utilizing the framework architecture, in accordance with an example implementation.

FIG. 5 illustrates an example process flow of an automated end-of-life battery management process (second use case) utilizing the framework architecture, in accordance with an example implementation. At stage 1, schema and rules, as well as decision logic (DL) sets are created by the network administrator and approved by the relevant stakeholders. As illustrated in FIG. 5, the process begins by creating or updating schema and governance rules by the network administrator at S502. At S504, the network administrator requests the relevant stakeholders' approval of the schema and rules. Once the schema and rules are approved by the relevant stakeholders, the schema and the rules are then stored. At S506, the network administrator creates or updates DL sets for a workflow. At S508, the network administrator requests the relevant stakeholders' approval of the DL sets. Once the DL sets are approved by the relevant stakeholders, the DL sets are then stored. The approved schema and rules, and the DL sets are stored under context-based shared data and DL sets, and may be retrieved during the workflow.

Stage 2 of the automated end-of-life battery management process applies the approved schema and rules, and the DL sets to the workflow. For the edge device, smart & trusted edge layer 106, the process begins by reading the DL sets at S520. At S522, the edge device aggregates sensor data from sensors 110 and data from management system through the edge data aggregator to identify anomalies. At S524, the edge device then alerts the user and recommends desired actions.

For the general workflow, the process begins at an asset owner's end, where the asset owner makes a request for end-of-life service through application on owner's end at S526. The end-of-life service request is stored and tracked under the context-based shared data and DL sets. At S528, on receiving the end-of-life service request, a service partner performs asset inspection and notifies manufacturer at S528. On completion of S528, the information is stored under the context-based shared data and DL sets, and provided to product manufacturer. At S530, the DL sets are read on the product manufacturer's end. At S532, a determination is made on whether to perform remaining life estimation based on read DL sets. If estimation is performed at S532, then end-of-life battery sales offer is made at S534 and sent to a Re* provider, which is one of the relevant stakeholders. At S536, a determination is made by the Re* provider as to whether to approve the offer.

If offer is approved on the Re* provider's end, then the process continues to S538, where end-of-life battery purchase offer is made and sent to the service partner. Data or information pertaining to the end-of-life battery purchase offer is stored at the context-based shared data and DL sets. At S540, a determination is made by the service partner as to whether to approve the end-of-life battery purchase offer. If the purchase offer is approved by the service partner at S540, then a shipping request is generated at S542 and issued to a shipping provider. Data or information pertaining to the shipping request is stored at the context-based shared data and DL sets. On receipt of the shipping request, the shipping provider then picks up and transports the end-of-life battery at S544. Data or information pertaining to battery pick up and transportation is stored at the context-based shared data and DL sets. On completion of S544, payment is then made by the Re*provider at S546 and the process comes to an end. Data or information pertaining to the payment is stored at the context-based shared data and DL sets.

The data or information stored at the context-based shared data and DL sets during stage 2 can be accessed and reviewed by the relevant stakeholders based on the approved schema and governance rules. The data or information stored during stage 2 can be further divided into business workflow data and business workflow decisions.

Figure 6:
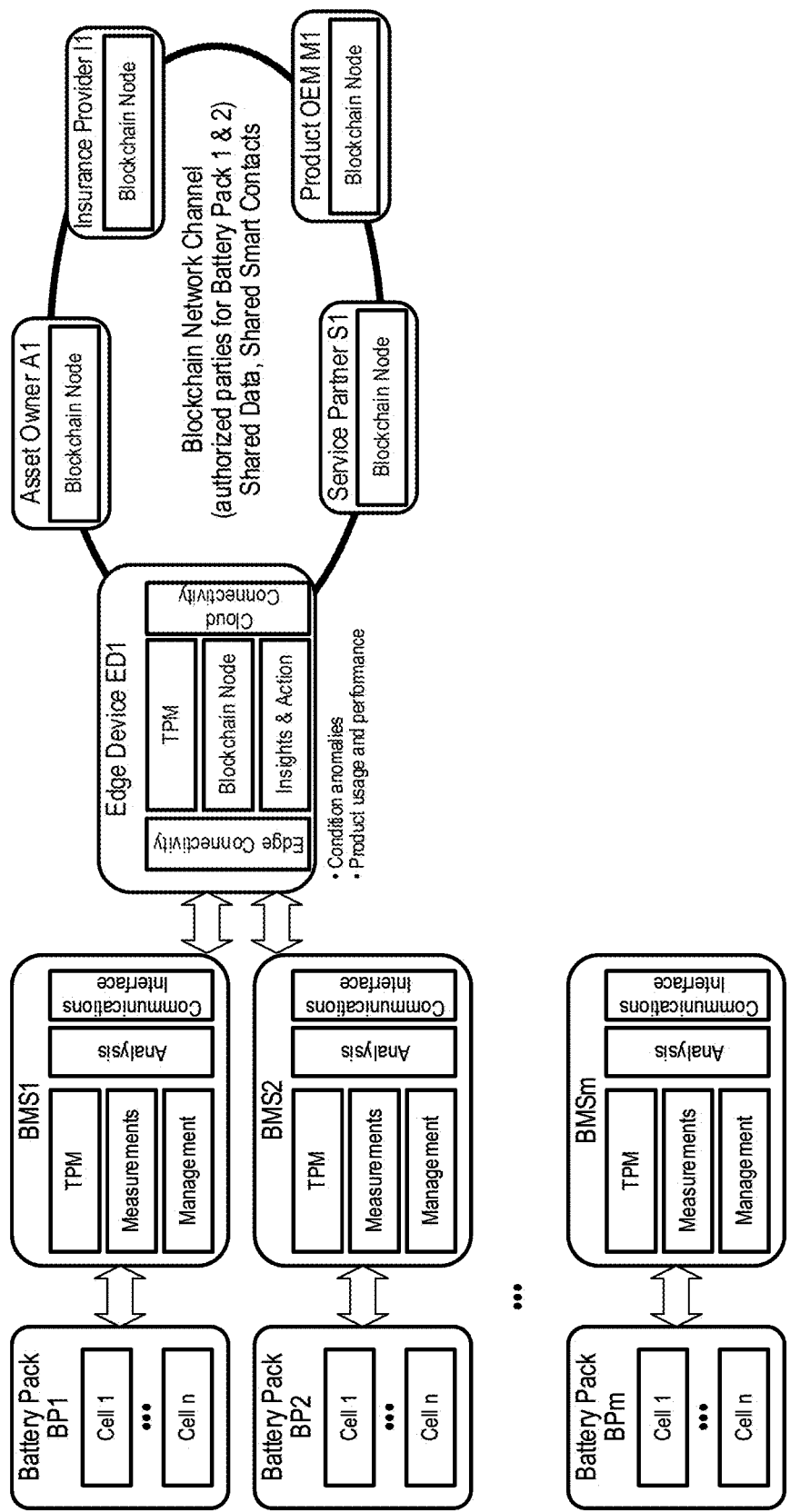
FIG. 6 illustrates an example chain of custody workflow utilizing a blockchain network, in accordance with an example implementation.

FIG. 6 illustrates an example chain of custody workflow utilizing a blockchain network, in accordance with an example implementation. Battery packs BP1 to BPm, Battery Management Systems (BMS) 1 to BMSm, and Edge Device ED1 are manufactured by Product Original Equipment Manufacturer (OEM) M1. Each of the battery packs BP1 to BPm includes battery cells 1–n. Battery packs BP1 to BPm are purchased by Asset Owner A1 from Service Partner S1. In addition to selling battery packs, Service Partner S1 also provides service contracts to monitor and service the sold battery packs. Insurance Provider I1 provides insured performance guarantee for the sold battery packs.

A blockchain network channel is joined by the Asset Owner A1, Service Partner S1, Product OEM M1, Insurance Provider I1, and the Edge Device ED1. The Asset Owner A1, Service Partner S1, Product OEM M1, and Insurance Provider I1 are authorized parties or stakeholders for battery packs BP1 to BPm. The blockchain network channel allows for tracking of battery conditions, performance, as well as identification of anomalies associated with battery usage.

BMS 1 to BMSm, as well as the Edge Device ED1, each has a built-in Trusted Platform Module (TPM) component. Each of the TPM components has a unique security key that is provided by the Service Partner S1 to the Asset Owner A1. The analysis module of each of the BMSs (BMS1 to BMSm) appends the unique security key associated with its TPM to its measurement data to generate combined data, and sends the combined data to the Edge Device ED1.

The Edge Device ED1 then aggregates measurement data from each of BMS1 to BMSm while retaining the unique security key from each BMS. The Edge Device ED1 also appends its own unique security key associated with its TPM with the aggregated dataset before submitting it to the blockchain network channel.

Figure 7:
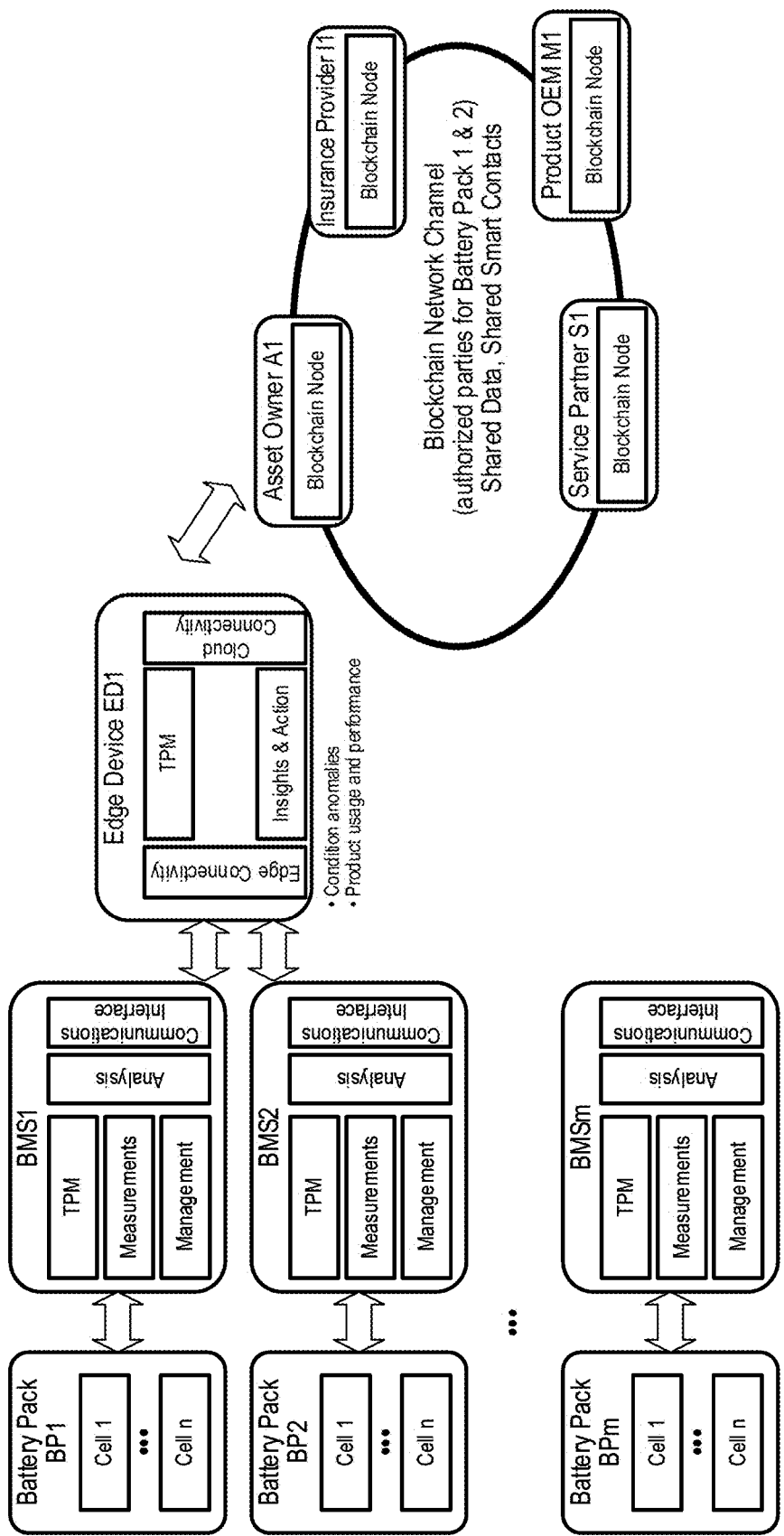
FIG. 7 illustrates an alternative chain of custody workflow utilizing a blockchain network without having the Edge device forming part of the blockchain network, in accordance with an example implementation.

FIG. 7 illustrates an alternative chain of custody workflow utilizing a blockchain network without having the Edge device forming part of the blockchain network, in accordance with an example implementation. Battery packs BP1 to BPm, Battery Management Systems (BMS) 1 to BMSm, and Edge Device ED1 are manufactured by Product Original Equipment Manufacturer (OEM) M1. Each of the battery packs BP1 to BPm includes battery cells 1–n. Battery packs BP1 to BPm are purchased by Asset Owner A1 from Service Partner S1. In addition to selling battery packs, Service Partner S1 also provides service contracts to monitor and service the sold battery packs. Insurance Provider I1 provides insured performance guarantee for the sold battery packs.

Unlike FIG. 6, the blockchain network channel is joined by the Asset Owner A1, Service Partner S1, Product OEM M1, and Insurance Provider I1. The Asset Owner A1, Service Partner S1, Product OEM M1, and Insurance Provider I1 are authorized parties or stakeholders for battery packs BP1 to BPm. The blockchain network channel allows for tracking of battery conditions, performance, as well as identification of anomalies associated with battery usage.

BMS 1 to BMSm, as well as the Edge Device ED1, each has a built-in Trusted Platform Module (TPM) component. Each of the TPM components has a unique security key that is provided by the Service Partner S1 to the Asset Owner A1. The analysis module of each of the BMSs (BMS1 to BMSm) appends the unique security key associated with its TPM to its measurement data to generate combined data, and sends the combined data to the Edge Device ED1.

The Edge Device ED1 then aggregates measurement data from each of BMS1 to BMSm while retaining the unique security key from each BMS. The Edge Device ED1 also appends its own unique security key associated with its TPM to the aggregated dataset before submitting it to the Asset Owner A1 node app. The Asset owner A1 node app then submits the aggregated data, along with the TPM keys, to the blockchain network channel.

Figure 8:
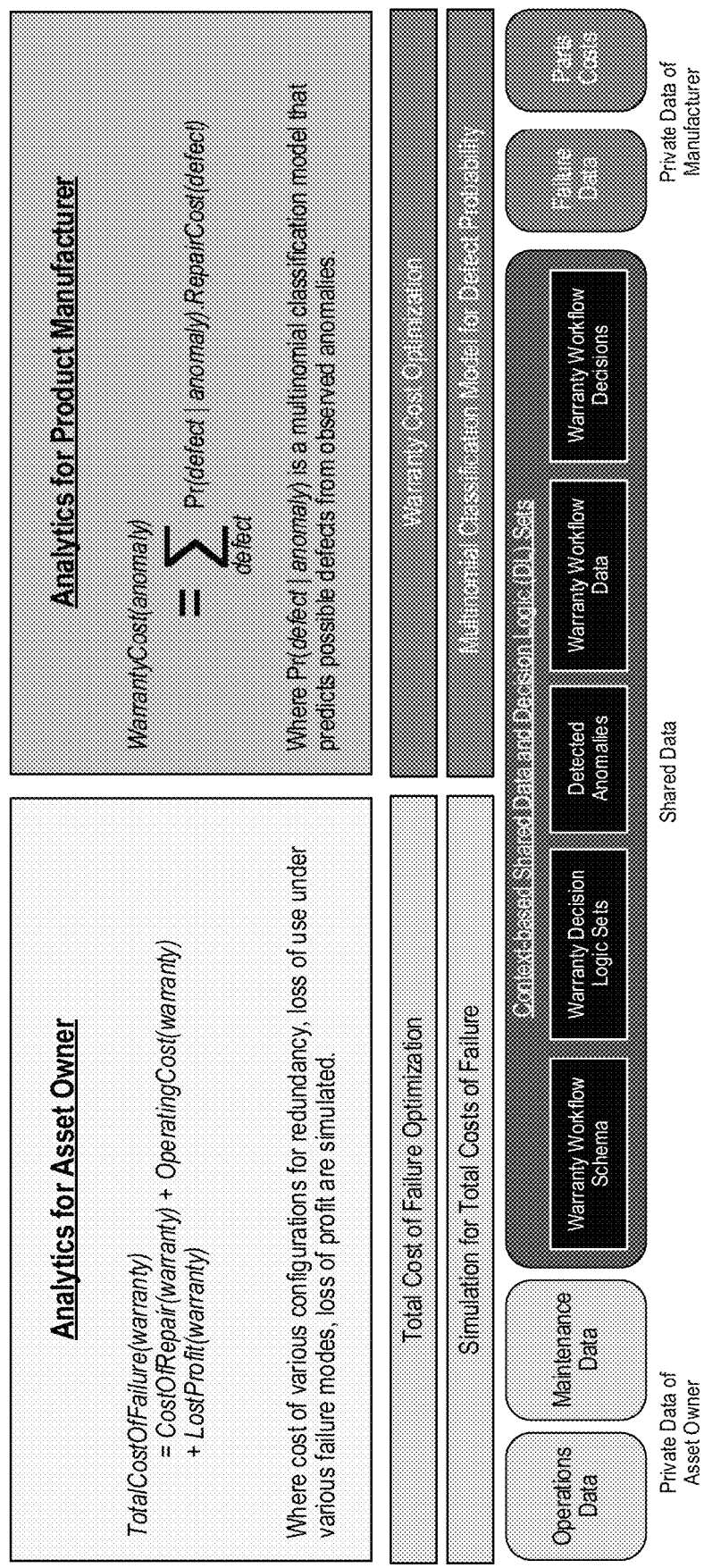
FIG. 8 illustrates an example warranty and failure costs optimization process associated with the first use case, utilizing the framework architecture, in accordance with an example implementation.

FIG. 8 illustrates an example warranty and failure costs optimization process associated with the first use case, utilizing the framework architecture, in accordance with an example implementation. The framework architecture supports generation of deeper insights by combining trusted shared data with stakeholders' own private data. These insights can be based on objective functions specific to a stakeholder. As illustrated in FIG. 8, product manufacturers can optimize warranty costs using shared warranty service workflow data and private data such as product failure data and parts costs, Similarly, asset owners can simulate total cost of failure using the same shared warranty service workflow data and their private data such as asset operations and maintenance data.

Figure 9:
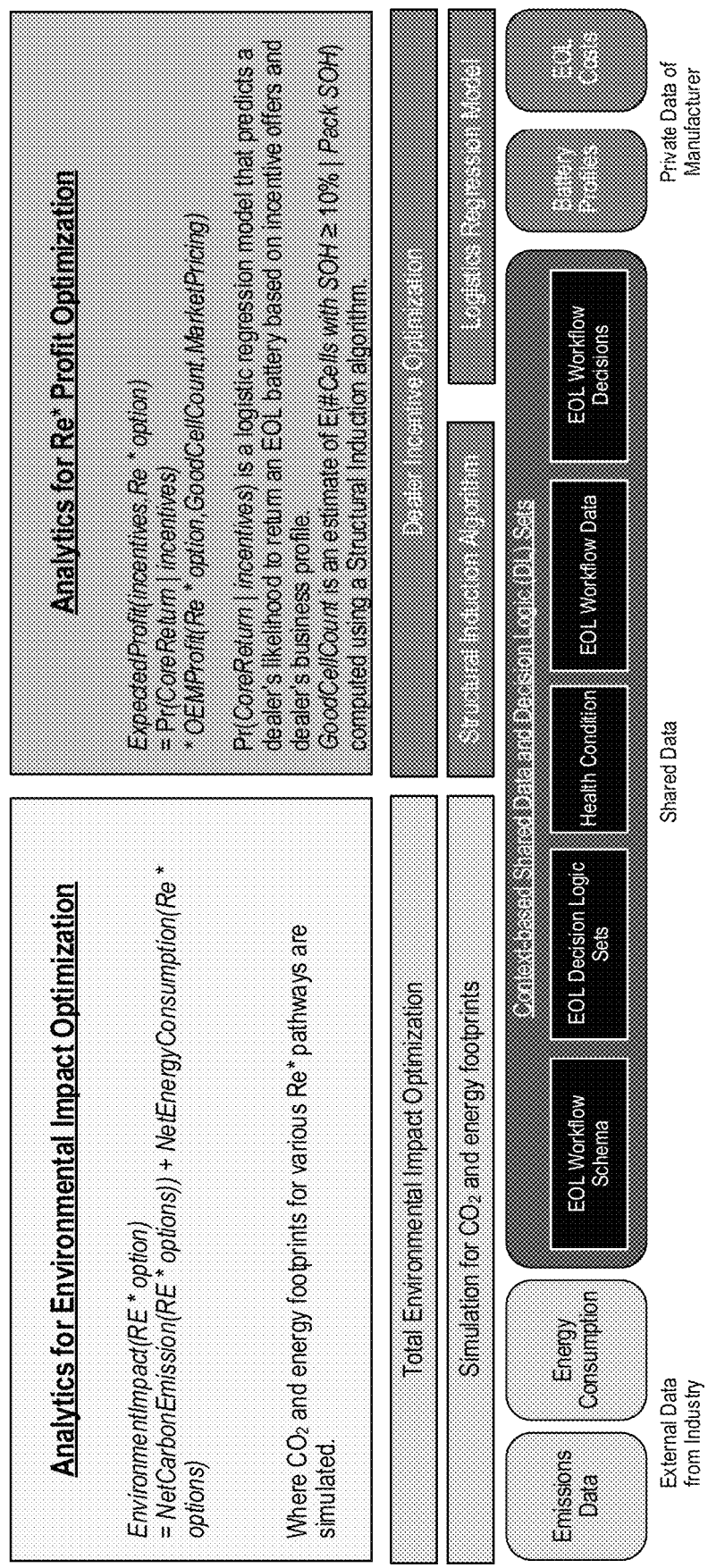
FIG. 9 illustrates an example end-of-life decision optimization process associated with the second use case, utilizing the framework architecture, in accordance with an example implementation.

FIG. 9 illustrates an example end-of-life decision optimization process associated with the second use case, utilizing the framework architecture, in accordance with an example implementation. The framework architecture supports generation of deeper insights by combining trusted shared data with stakeholders' own private data. These insights can be based on objective functions specific to a stakeholder. As illustrated in FIG. 9, Re* (repurposing/recycling) providers can optimize their profits using shared end-of-life workflow data and their private data such as battery profiles and end-of-life costs. Similarly, environmental impact can be optimized using shared end-of-life workflow data and external data from the industry such as emissions data and energy consumption.

The foregoing example implementation may have various benefits and advantages. For example, the ability to collection broad information categories associated with battery asset operations from different stakeholders in the electrification ecosystem. The framework architecture enables automation of decision making via smart contracts as relevant workflow participants have already agreed to the shared data and decision logic sets. The framework architecture establishes a secure and tamper-proof chain of custody of data ingested from edge devices into the platform data layer. Trust in data and insights based on single source of truth eliminates manual reconciliation of data and insights, and can save significant time and costs for the business network participants.

In addition, data and decision governance is enabled to create, update, and receive agreement of data schema and decision logic sets. A rich analytics layer is provided that generates building blocks for a wide variety of use cases such as supply chain analytics, risk management analytics, battery health and performance analytics, business decision making analytics, and behavioral analytics. Furthermore, the context-based shared data and decision logic (DL) sets provides data traceability and transparency, and provides automated decisions based on stakeholder input. The context-based shared data and DL sets simplifies workflow processing and provides trusted analytics insights.

Figure 10:
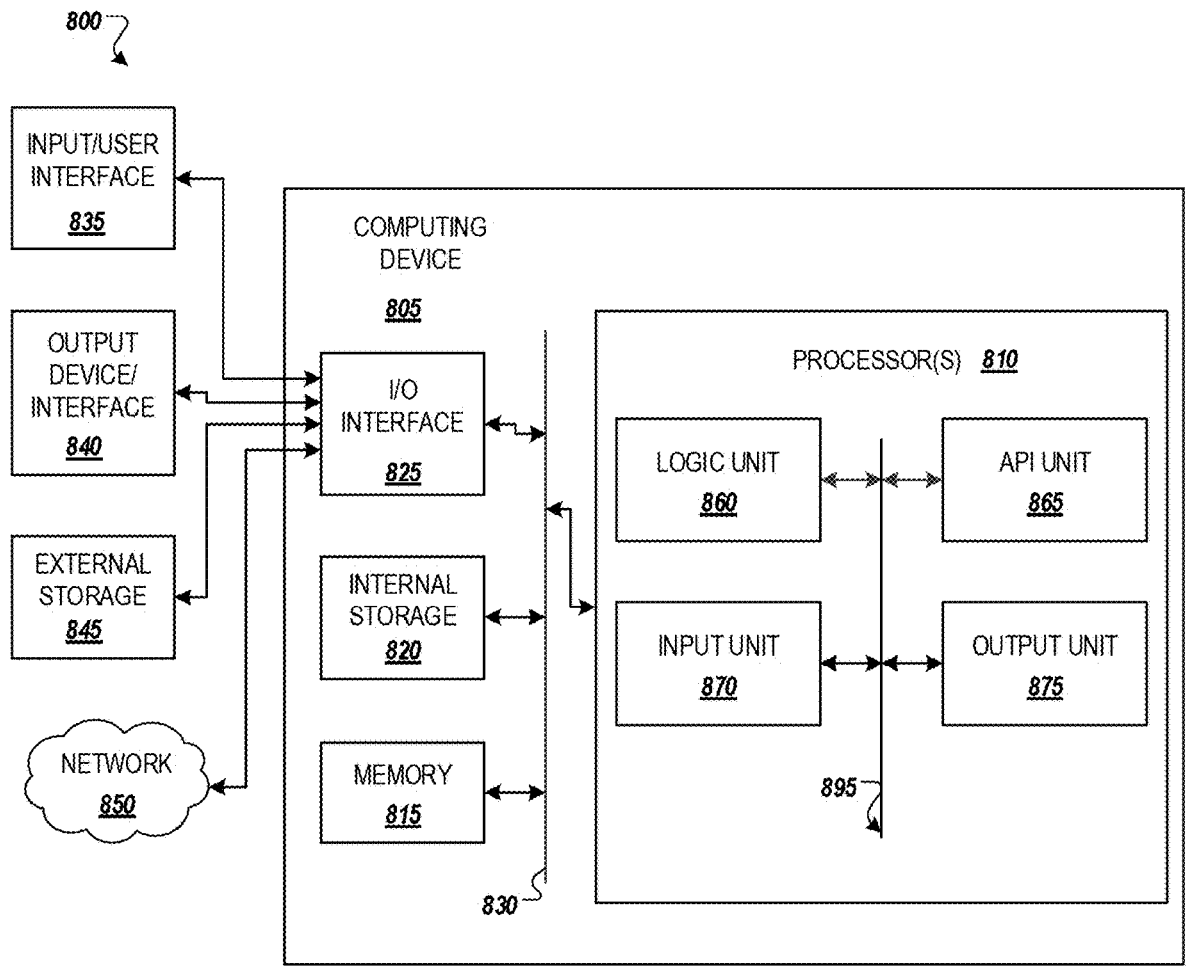
FIG. 10 illustrates an example computing environment with an example computing device suitable for use in some example implementations.

FIG. 10 illustrates an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid-state storage, and/or organic), and/or IO interface 825, any of which can be coupled on a communication mechanism or bus 830 for communicating information or embedded in the computing device 805. IO interface 825 is also configured to receive images from cameras or provide images to projectors or displays, depending on the desired implementation.

Computing device 805 can be communicatively coupled to input/user interface 835 and output device/interface 840. Either one or both of the input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via 10 interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

IO interface 825 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of hardware processors such as central processing units (CPUs) or in a combination of hardware and software units.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, the input unit 870, the output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide an output based on the calculations described in example implementations.

Processor(s) 810 can be configured to create or update shared data schema and data governance rules associated with data to be received from a plurality of parties, wherein the plurality of parties are stakeholders to the multi-party workflows, and the data is associated with a battery system as shown in FIGS. 1 and 3. The processor(s) 810 may also be configured to submit the shared data schema and the data governance rules for approval to the plurality of parties as shown in FIGS. 1 and 3. The processor(s) 810 may also be configured to create or update decision logics associated with the data to be received as shown in FIGS. 1 and 3. The processor(s) 810 may also be configured to submit the decision logics for approval to the plurality of parties as shown in FIGS. 1 and 3. The processor(s) 810 may also be configured to receive the data from the plurality of parties as shown in FIGS. 1 and 3. The processor(s) 810 may also be configured to apply the approved shared data schema, the approved data governance rules, and the approved decision logics to the multi-party workflows and the received data from the plurality of parties to perform automated decision optimization as shown in FIGS. 1 and 3.

The processor(s) 810 may also be configured to read, by an edge device, the approved decision logics. The processor(s) 810 may also be configured to aggregate, by the edge device, battery management system data and sensor data associated with the battery system as shown in FIG. 1. The processor(s) 810 may also be configured to detect, by the edge device, anomalies based on the approved decision logics as shown in FIG. 1. The processor(s) 810 may also be configured to generate, by the edge device, user alerts and recommended actions based on the approved decision logics as shown in FIG. 1.

The processor(s) 810 may also be configured to generate, by a battery management system, the battery management system data, and appending a first security key to the battery management system data as shown in FIGS. 6 and 7. The processor(s) 810 may also be configured to append, by the edge device, a second security key to the aggregated data and the detected anomalies as shown in FIGS. 6 and 7. The processor(s) 810 may also be configured to store, by the edge device, the aggregated data, the detected anomalies, and the appended second security to a blockchain network channel, wherein the second security key ensures transaction security for the aggregated data and the detected anomalies on the blockchain network channel as shown in FIGS. 6 and 7. The processor(s) 810 may also be configured to store, by the edge device, the battery management system data and the appended first security key to the blockchain network channel, wherein the first security key ensures transaction security for the battery management system data on the blockchain network channel as shown in FIGS. 6 and 7.

The processor(s) 810 may also be configured to derive, for each party of the plurality of parties, analytics based on the shared data and private data that is accessible only by the each party of the plurality of parties as shown in FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission, or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for sharing and analyzing information to support execution of multi-party workflows in an electrification ecosystem, the method comprising:
    creating or updating shared data schema and data governance rules associated with data to be received from a plurality of parties, wherein the plurality of parties are stakeholders to the multi-party workflows, and the data is associated with a battery system;
    submitting the shared data schema and the data governance rules for approval to the plurality of parties;
    creating or updating decision logics associated with the data to be received;
    submitting the decision logics for approval to the plurality of parties;
    receiving the data from the plurality of parties;
    applying approved shared data schema, approved data governance rules, and approved decision logics to the multi-party workflows and the received data from the plurality of parties to perform automated decision optimization;
    reading, by an edge device, the approved decision logics;
    generating, by a battery management system, battery management system data, and appending a first security key to the battery management system data;
    aggregating, by the edge device, the battery management system data and sensor data associated with the battery system to generate aggregated data;
    detecting, by the edge device, anomalies based on the approved decision logics;
    generating, by the edge device, user alerts and recommended actions based on the approved decision logics;
    appending, by the edge device, a second security key to the aggregated data and the detected anomalies;
    storing, by the edge device, the aggregated data, the detected anomalies, and the appended second security to a blockchain network channel, wherein the second security key ensures transaction security for the aggregated data and the detected anomalies on the blockchain network channel; and
    storing, by the edge device, the battery management system data and the appended first security key to the blockchain network channel, wherein the first security key ensures transaction security for the battery management system data on the blockchain network channel,
    wherein the blockchain network channel is joined by the plurality of parties for tracking battery conditions, performance, and the detected anomalies.

2. The method of claim 1, wherein the applying the approved shared data schema, the approved data governance rules, and the approved decision logics to the multi-party workflows and the received data from the plurality of parties to perform the automated decision optimization comprises:
    applying the approved shared data schema to the received data to generate shared data, wherein the shared data comprise a subset of the received data for the plurality of parties to access; and
    applying the approved data governance rules to the received data to determine data accessibility of the received data in association with each party of the plurality of parties.

3. The method of claim 2, wherein the applying the approved shared data schema, the approved data governance rules, and the approved decision logics to the multi-party workflows and the received data from the plurality of parties to perform the automated decision optimization further comprises:
    retrieving the approved decision logics for the plurality of parties during execution of the multi-party workflows, wherein the multi-party workflows are associated with warranty and performance guarantee of batteries;
    applying the approved decision logics to the data to generate workflow decisions; and
    storing the workflow decisions for review by the plurality of parties.

4. The method of claim 2, wherein the applying the approved shared data schema, the approved data governance rules, and the approved decision logics to the multi-party workflows and the received data from the plurality of parties to perform the automated decision optimization further comprises:
    retrieving the approved decision logics for the plurality of parties during execution of the multi-party workflows, wherein the multi-party workflows are associated with end-of-life management of batteries;
    applying the approved decision logics to the data to generate workflow decisions; and
    storing the workflow decisions for review by the plurality of parties.

5. The method of claim 2, further comprising:
    deriving, for each party of the plurality of parties, analytics based on the shared data and private data that is accessible only by the each party of the plurality of parties.

6. The method of claim 1, wherein the data comprises product configuration information, production testing results, acceptable operating conditions (AOC), customer registration information, warranty and risk sharing terms, performance guarantee terms, usage and condition anomalies (UCA), warranty service requests (WSR), insurance claim requests (ICR), and end-of-life (EOL) data.

7. The method of claim 1, wherein the electrification ecosystem comprises at least one of performance guarantee costs optimization or end-of-life (EOL) decision optimization.

8. A system for sharing and analyzing information to support execution of multi-party workflows in an electrification ecosystem, the system comprising:
an edge device;
a battery management system in communication with the edge device that generates battery management system data and appends a first security key to the battery management system data; and
a processor in communication with the edge device, wherein the processor is configured to:
create or update shared data schema and data governance rules associated with data to be received from a plurality of parties, wherein the plurality of parties are stakeholders to the multi-party workflows, and the data is associated with a battery system;
submit the shared data schema and the data governance rules for approval to the plurality of parties;
create or update decision logics associated with the data to be received;
submit the decision logics for approval to the plurality of parties;
receive the data from the plurality of parties; and
apply approved shared data schema, approved data governance rules, and approved decision logics to the multi-party workflows and the received data from the plurality of parties to perform automated decision optimization, the edge device performs:
reading the approved decision logics;
aggregating the battery management system data and sensor data associated with the battery system to generate aggregated data;
detecting anomalies based on the approved decision logics;
generating user alerts and recommended actions based on the approved decision logics;
appending a second security key to the aggregated data and the detected anomalies;
storing the aggregated data, the detected anomalies, and the appended second security to a blockchain network channel, wherein the second security key ensures transaction security for the aggregated data and the detected anomalies on the blockchain network channel; and
storing the battery management system data and the appended first security key to the blockchain network channel, wherein the first security key ensures transaction security for the battery management system data on the blockchain network channel,
wherein the blockchain network channel is joined by the plurality of parties for tracking battery conditions, performance, and the detected anomalies.

9. The system of claim 8, wherein the applying the approved shared data schema, the approved data governance rules, and the approved decision logics to the multi-party workflows and the received data from the plurality of parties to perform the automated decision optimization comprises:
applying the approved shared data schema to the received data to generate shared data, wherein the shared data comprise a subset of the received data for the plurality of parties to access; and
applying the approved data governance rules to the received data to determine data accessibility of the received data in association with each party of the plurality of parties.

10. The system of claim 9, wherein the applying the approved shared data schema, the approved data governance rules, and the approved decision logics to the multi-party workflows and the received data from the plurality of parties to perform the automated decision optimization further comprises:
retrieving the approved decision logics for the plurality of parties during execution of the multi-party workflows, wherein the multi-party workflows are associated with warranty and performance guarantee of batteries;
applying the approved decision logics to the data to generate workflow decisions; and
storing the workflow decisions for review by the plurality of parties.

11. The system of claim 9, wherein the applying the approved shared data schema, the approved data governance rules, and the approved decision logics to the multi-party workflows and the received data from the plurality of parties to perform the automated decision optimization further comprises:
retrieving the approved decision logics for the plurality of parties during execution of the multi-party workflows, wherein the multi-party workflows are associated with end-of-life management of batteries;
applying the approved decision logics to the data to generate workflow decisions; and
storing the workflow decisions for review by the plurality of parties.

12. The system of claim 9, further comprising:
deriving, for each party of the plurality of parties, analytics based on the shared data and private data that is accessible only by the each party of the plurality of parties.

13. The system of claim 8, wherein the data comprises product configuration information, production testing results, acceptable operating conditions (AOC), customer registration information, warranty and risk sharing terms, performance guarantee terms, usage and condition anomalies (UCA), warranty service requests (WSR), insurance claim requests (ICR), and end-of-life (EOL) data.

14. The system of claim 8, wherein the electrification ecosystem comprises at least one of performance guarantee costs optimization or end-of-life (EOL) decision optimization.

* * * * *